United States Patent [19]
Christensen et al.

[11] Patent Number: 6,045,441
[45] Date of Patent: Apr. 4, 2000

[54] METHOD AND APPARATUS FOR PEELING SAUSAGE

[75] Inventors: Jeffrey P. Christensen; Derek E. Householder; Benjamin O. Strattan, all of Algona, Iowa; Robert W. Reinke, Sr.; Robert W. Reinke, Jr., both of Janesville, Wis.

[73] Assignees: Algona Fabrication and Equipment Company, Algona, Iowa; Peelmen, Ltd., Janesville, Wis.

[21] Appl. No.: 09/208,901

[22] Filed: Dec. 10, 1998

[51] Int. Cl.[7] .................................................. A22C 13/00
[52] U.S. Cl. ............................................................ 452/50
[58] Field of Search .......................................... 452/50, 49

[56] References Cited

U.S. PATENT DOCUMENTS

| | | | |
|---|---|---|---|
| 2,672,646 | 3/1954 | Demarest et al. | 452/50 |
| 3,570,044 | 3/1971 | Gartrell | 452/50 |
| 3,895,414 | 7/1975 | Klyce | 452/50 |
| 4,024,602 | 5/1977 | Stiles | 452/50 |
| 4,637,095 | 1/1987 | Maruska | 452/50 |
| 5,246,395 | 9/1993 | Zirps et al. | 452/50 |

*Primary Examiner*—Willis Little
*Attorney, Agent, or Firm*—Mau & Krull, P.A.

[57] ABSTRACT

An apparatus and method for removing casing from a body of a sausage includes an infeed mechanism to provide forward movement of the body of the sausage along a feed path, with the tuft of the sausage leading the body of the sausage. A cutting device is operatively connected to the apparatus for cutting the casing of the sausage. A tucker plate is moveable between an unengaged position to an engaged position. A pair of stripper rollers are positioned below the tucker plate assembly. The body of the sausage contacts the tucker plate, causing the grasping members to more from the unengaged to the engaged position, forcing the tuft down between the stripper rollers and the casing is removed.

16 Claims, 15 Drawing Sheets

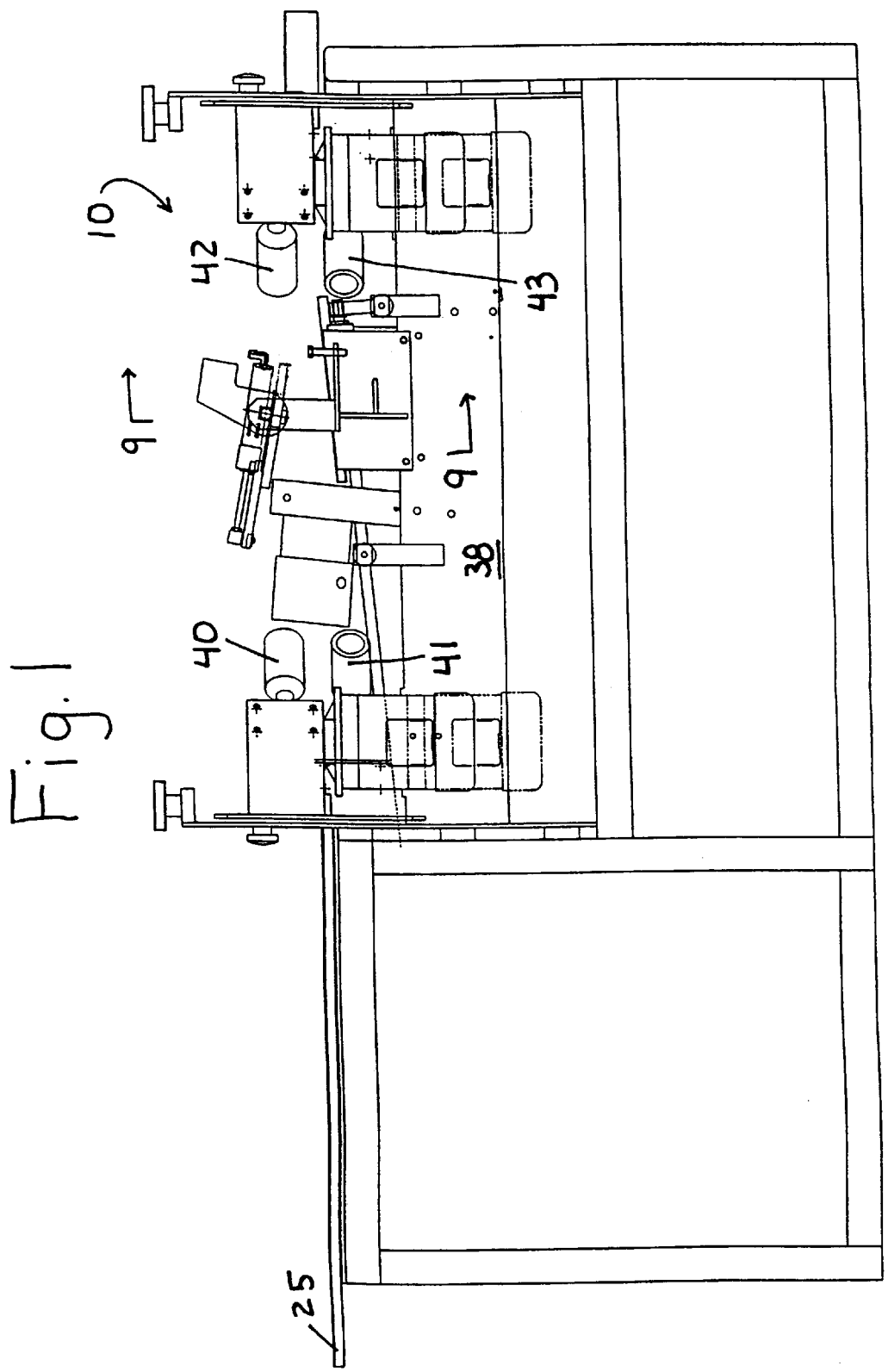

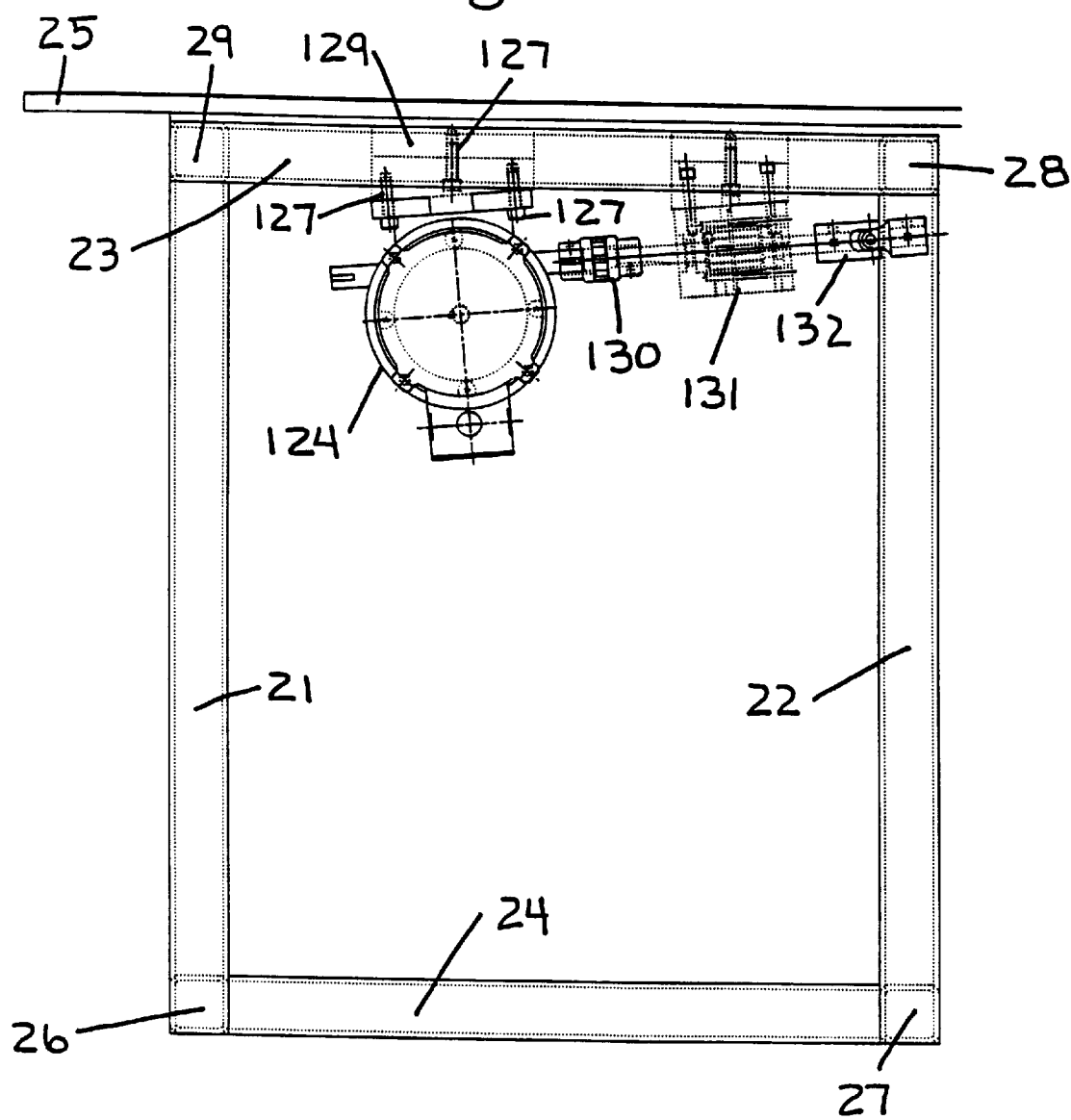

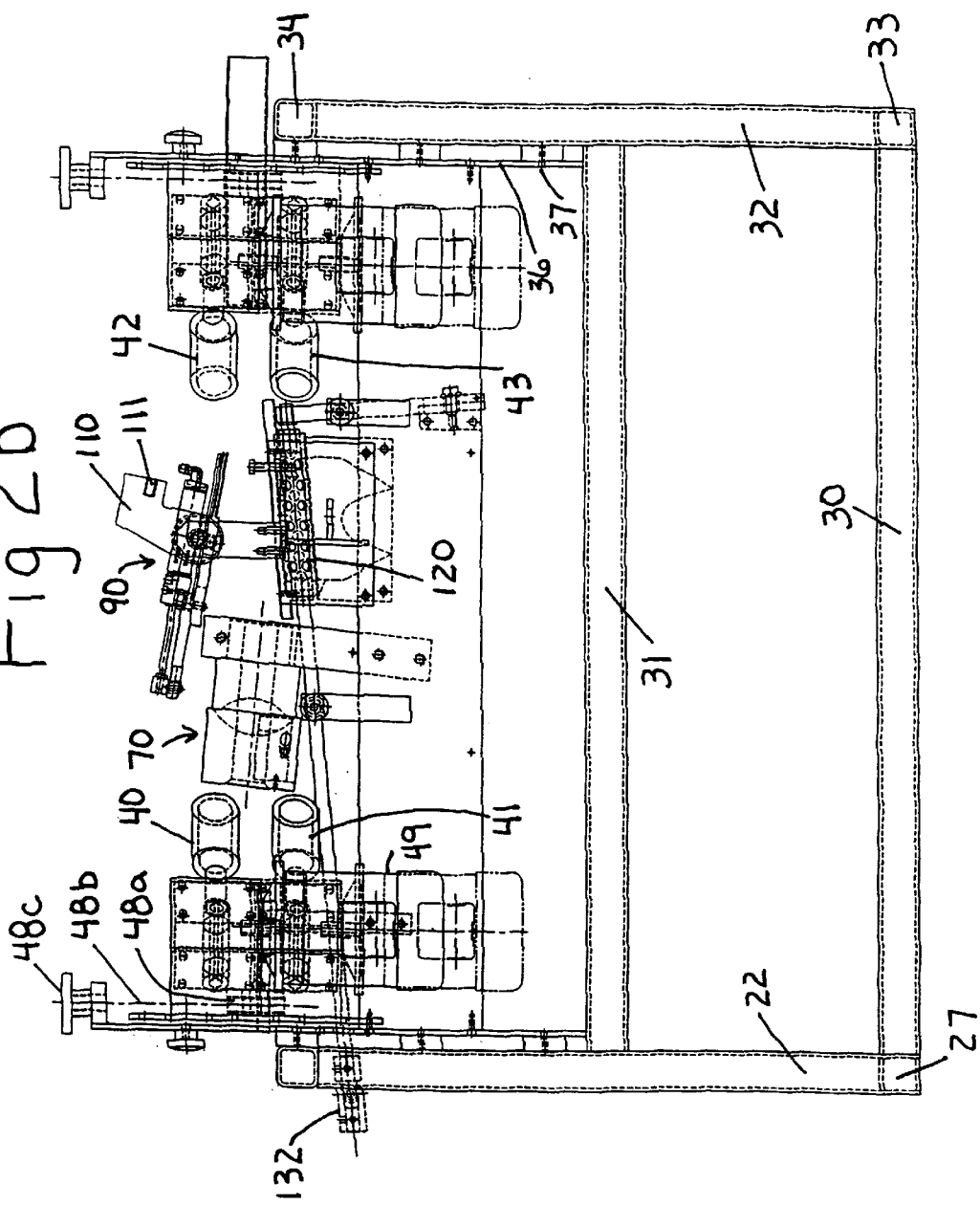

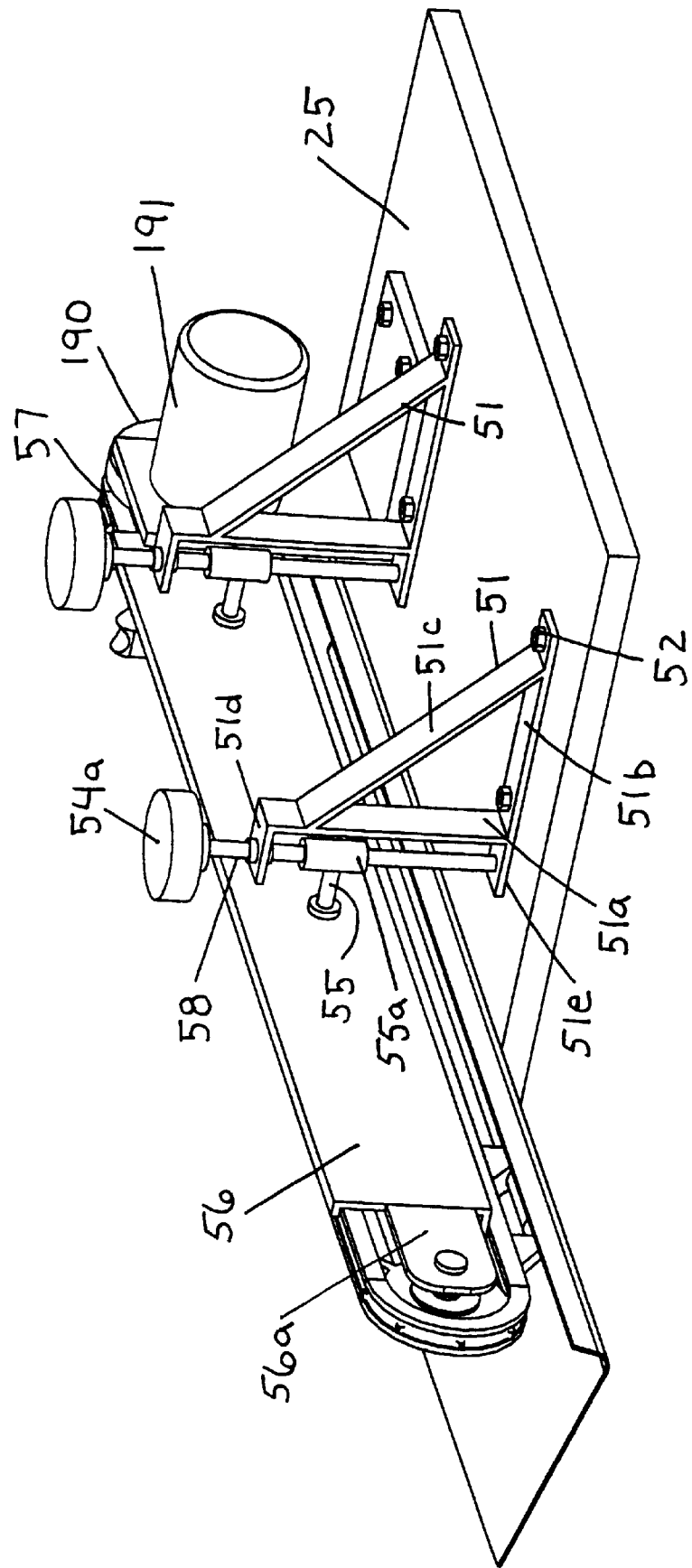

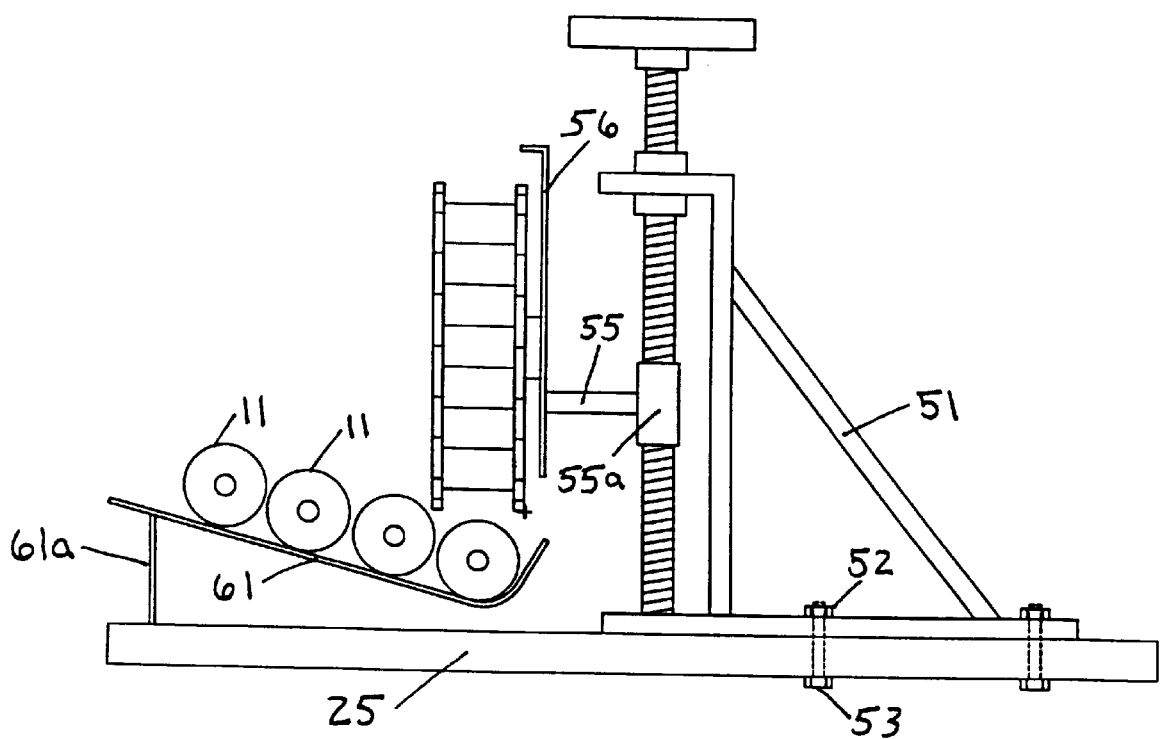

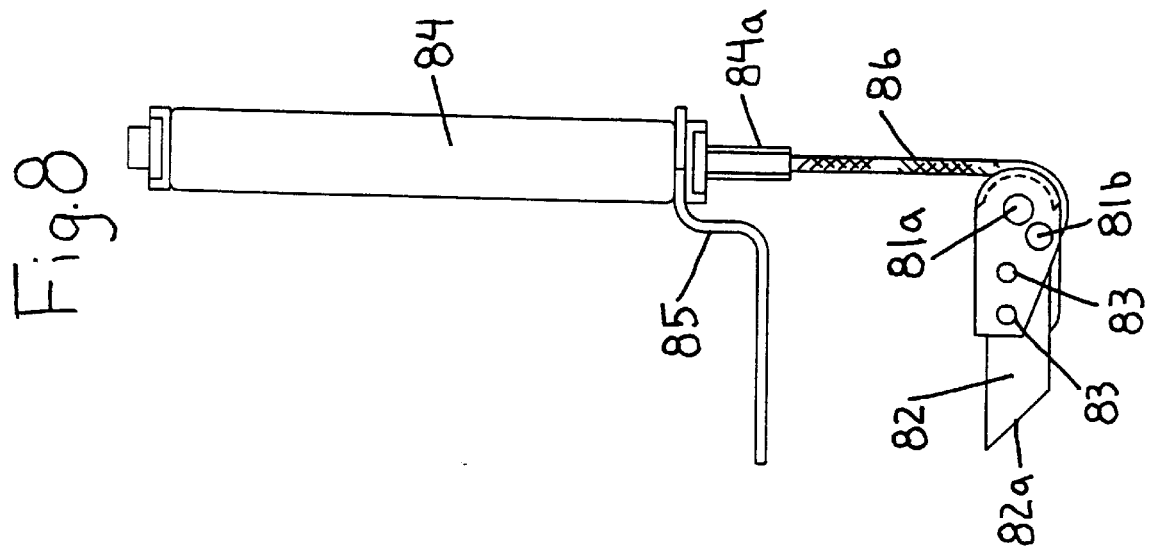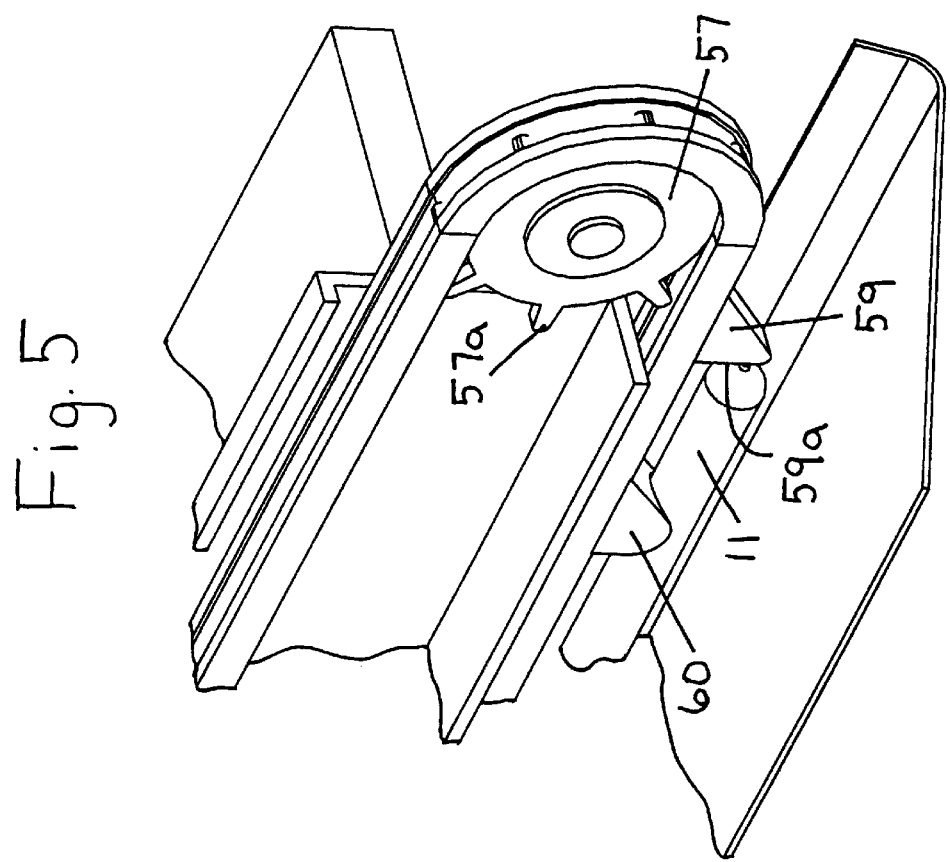

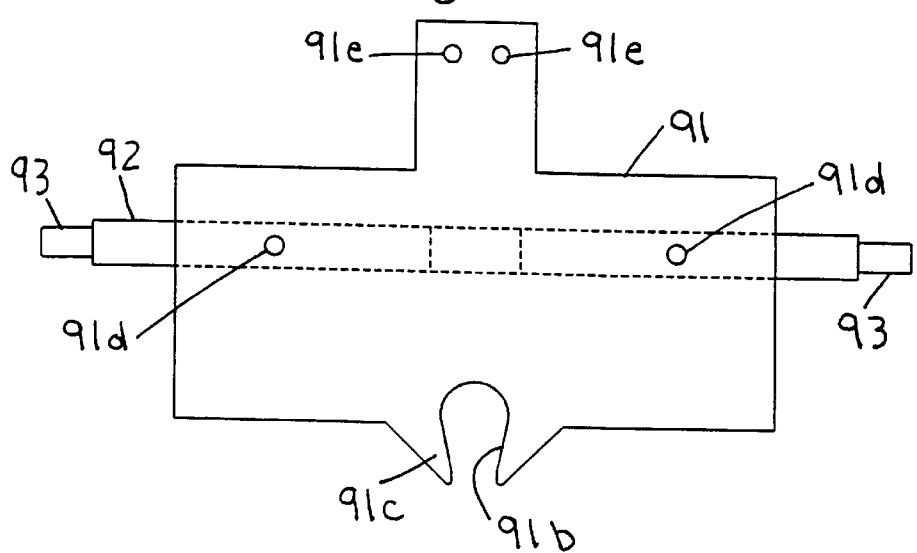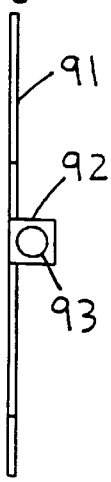

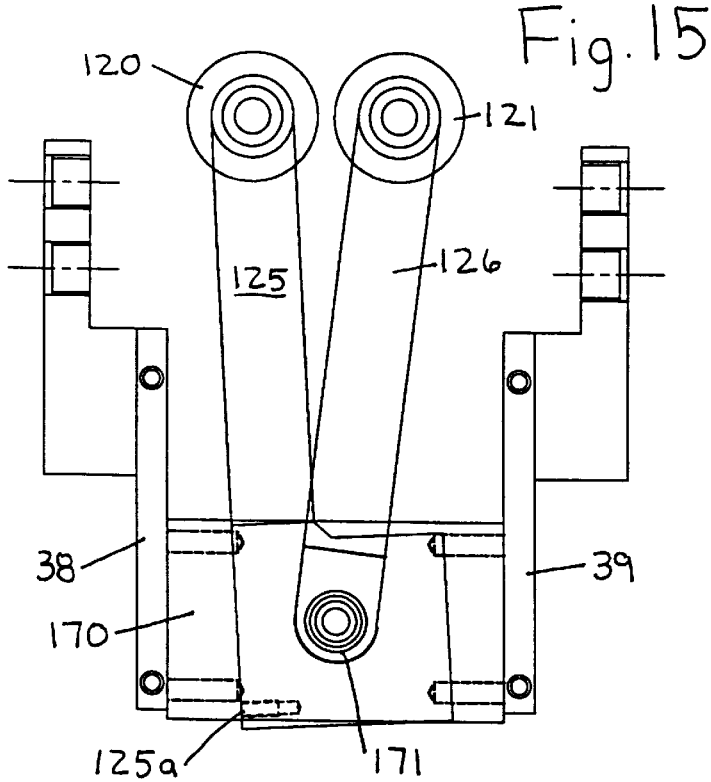
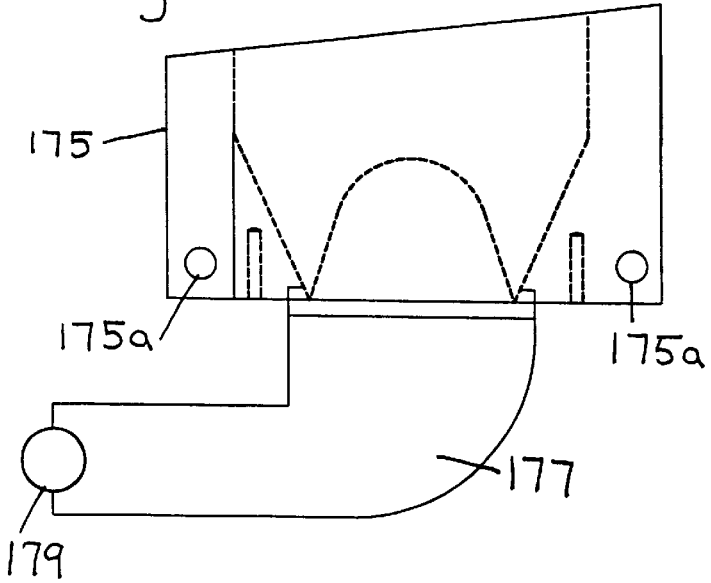
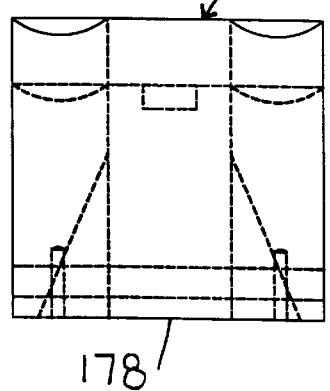

METHOD AND APPARATUS FOR PEELING SAUSAGE

BACKGROUND OF THE INVENTION

1. Field of the Invention

The field of the invention is meat processing equipment, and more particularly, equipment for removing natural or artificial casings from sausages.

2. Description of the Prior Art

Sausages for human consumption come in a wide variety of compositions. Sausages are, generally speaking, elongated and cylindrical in shape, although they range greatly in size. When sausage is made, its ingredients are stuffed into a casing, which may be a natural casing or an artificial casing made of a synthetic material. The sausage is then cooked in one of many sausage-making processes. The result is generally an elongated, whole sausage or a chain of sausage links.

After producing the sausage, some post-processing may be desired before packaging. Thus, a large bologna may be cut into slices before being packaged as sandwich meat. An artificial casing on wieners may be removed to produce "skinless" wieners. And pepperoni may be skinned and sliced for use in pizza.

Small sausage and linked sausage can be made in natural or artificial casing. When these casings are edible, such sausages are sold and generally consumed with the casing. Larger sausage needs a stronger casing and is generally made in a fiber reinforced plastic casing. This casing adheres to the meat to varying degrees and may even break apart as it is removed from the body of the sausage. This happens particularly with dry sausage where the casing is made brittle by the drying process.

Removal of the fibrous casings may be facilitated by using "easy-to-peel" casings which are impregnated with additives that inhibit the adherence of the casing to the meat. The adherence may be so slight that in some cases, air injected into the casing can inflate it and release it from the meat entirely before the sausage is fed to a casing removal mechanism.

Two ways have been known to feed sausage into sausage processing machines. One is to feed the sausages longitudinally using feed rollers with axes of rotation that are transverse and perpendicular to the longitudinal axis of the sausage. This has been used with "easy-to-peel" casings. The other is to feed the sausage using feed rollers with skewed axes, so that the sausage is fed along a helical path. This has been used for regular casings.

With most casings, there is a hanging string at one end of the sausage. This string can be looped over a cross bar to allow the sausage to hang vertically. This string is also used when the sausage is fed into a sausage-peeling machine. There the skin is slit along the full length of the sausage. A pair of peeling rollers are below the sausage feed path, and the hanging string is attracted to the peeling rollers by suction. The skin is then pulled through the rotating peeling rollers and the casing is progressively stripped from the body of the sausage as it is fed past the rollers.

Such a method may be suitable for removing "easy-to-peel" casings, where the casing is inflated by air injection and fully released from the body of the sausage before it is fed into the peeling mechanism. There have been several problems, however, in using such a method to remove casings from sausage. First, "easy-to-peel" casings are more expensive, and therefore, their use is resisted and limited to only a small percentage of the sausage that is produced. Second, slitting the casing for the full length of the sausage usually slits the body of the sausage also and is unacceptable to most producers. Third, air injection alone will not overcome the adherence of regular casings to meat and release them entirely from the sausage. Fourth, gripping the hanging string has not been an adequately reliable way of starting the peeling operation. And fifth, the addition of humidifiers to moisten the casings where they have become dry and brittle, has tended to wet the hanging string and cause it to become wrapped around and stuck to the outside of the casing, where it cannot be suitably attracted to the peeling rollers.

In addition, another method and apparatus for peeling sausage is described in U.S. Pat. No. 4,637,095. A pair of skewed feed rollers cause the sausage to move both longitudinally and rotationally, cutting the casing on a nose portion of the sausage. The tuft on the forward end of the sausage is gripped with a pair of peeling rollers. The peeling rollers are moved to a position tangent to the sausage feed path. The tuft is then pulled through the peeling rollers radially outward from the body to unwrap the casing in a helical pattern as the body is fed past the peeling mechanism. The peeling rollers are moved through a 90-degree orientation during this process. However, with sausages of varying firmness, the input rollers do not always feed the sausage at the same speed. Further, the knife is not easily positionable so that the nose portion of the sausage is always cut at the correct location. In order to later be stripped, the slice of the casing, caused by the knife, should begin on the nose portion of the sausage, proximate the tuft, at a position about 10:00. Then, when the tuft is later pulled downward, the casing is pulled over the end of the sausage and peeled more easily. It is important that the knife blade be adjustable so that the slice can always start at the approximately correct position when it reaches the stripper rollers. Still further, it would be advantageous to not have the stripping rollers rotate through the 90 degrees in order to provide a more efficient peeling apparatus.

The present invention addresses the problems associated with the prior art and provides for a better method and apparatus for peeling sausages.

SUMMARY OF THE INVENTION

The invention is an apparatus for removing a casing from a body of sausage. The casing is formed with a tuft at one end of the body. The apparatus includes an infeed mechanism operatively connected to a frame; the infeed mechanism provides forward movement of the body of sausage along a feed path with the tuft leading the body of the sausage. A cutting device is operatively connected to the frame and cuts the casing of the sausage. The cutting device is downstream from the infeed mechanism. A tucker plate assembly is operatively connected to a frame and has a grasping member which is moveable from an unengaged position to an engaged position. A pair of stripper rollers are positioned below the tucker plate assembly and have a longitudinal axis. The rollers revolve around their longitudinal axis and are substantially parallel to each other. The rollers form a generally V-shaped surface on which the body of the sausage is positioned. The rollers revolve in opposite directions. An outfeed mechanism is operatively connected to the frame and provides forward movement of the body of the sausage after the body passes the tucker plate assembly. The outfeed mechanism is located downstream from the stripper rollers, wherein when the body of the sausage contacts the tucker plate, the grasping members move from an unengaged position to an engaged position, forcing the tuft down between the stripper rollers, and the casing is removed.

In another embodiment, the invention is a method for removing casings from a body of a sausage which has a leading end and a trailing end. The sausage is formed with a tuft on the leading end of the body. The method includes feeding the body of sausage forward along a feed path through a feeding station and rotating the sausage as it is being fed. A knife blade assembly is secured in a rotational orientation to begin slitting the casing at a selected location. The tuft of sausage is grasped and pushed downward between two stripper rollers, wherein the casing is stripped off the sausage as it is continually fed along the feed path. The trailing end is fed past the stripper rollers to allow removal of the casing from the trailing end.

BRIEF DESCRIPTION OF THE DRAWINGS

FIG. 1 is a side elevational view of the apparatus for peeling sausage according to the present invention;

FIG. 2a is a side elevational view of the left side of the apparatus shown in FIG. 1 with several components shown in phantom to show components hidden in FIG. 1;

FIG. 2b is a side elevational view of the right side of the apparatus shown in FIG. 1 with several components shown in phantom to show components hidden in FIG. 1;

FIG. 3 is a perspective view from behind of an input conveyor for use with the apparatus shown in FIG. 1;

FIG. 4 is a side elevational view of the input conveyor shown in FIG. 3;

FIG. 5 is an enlarged perspective view of a portion of the input conveyor shown in FIG. 3, shown from the front;

FIG. 8 is a schematic representation of a portion of the knife blade holder shown in FIG. 7;

FIG. 11 is a front elevational view of the tucker plate;

FIG. 12 is a side elevational view of the tucker plate shown in FIG. 11;

FIG. 15 is a rear elevational view of the bearing blocks holding the shafts of the apparatus of FIG. 1;

FIG. 16 is a side elevational view of the vacuum block of the apparatus of claim 1; and FIG. 17 is an end view of the vacuum block of the apparatus of claim 1.

DETAILED DESCRIPTION OF THE PREFERRED EMBODIMENT

Figure 6:
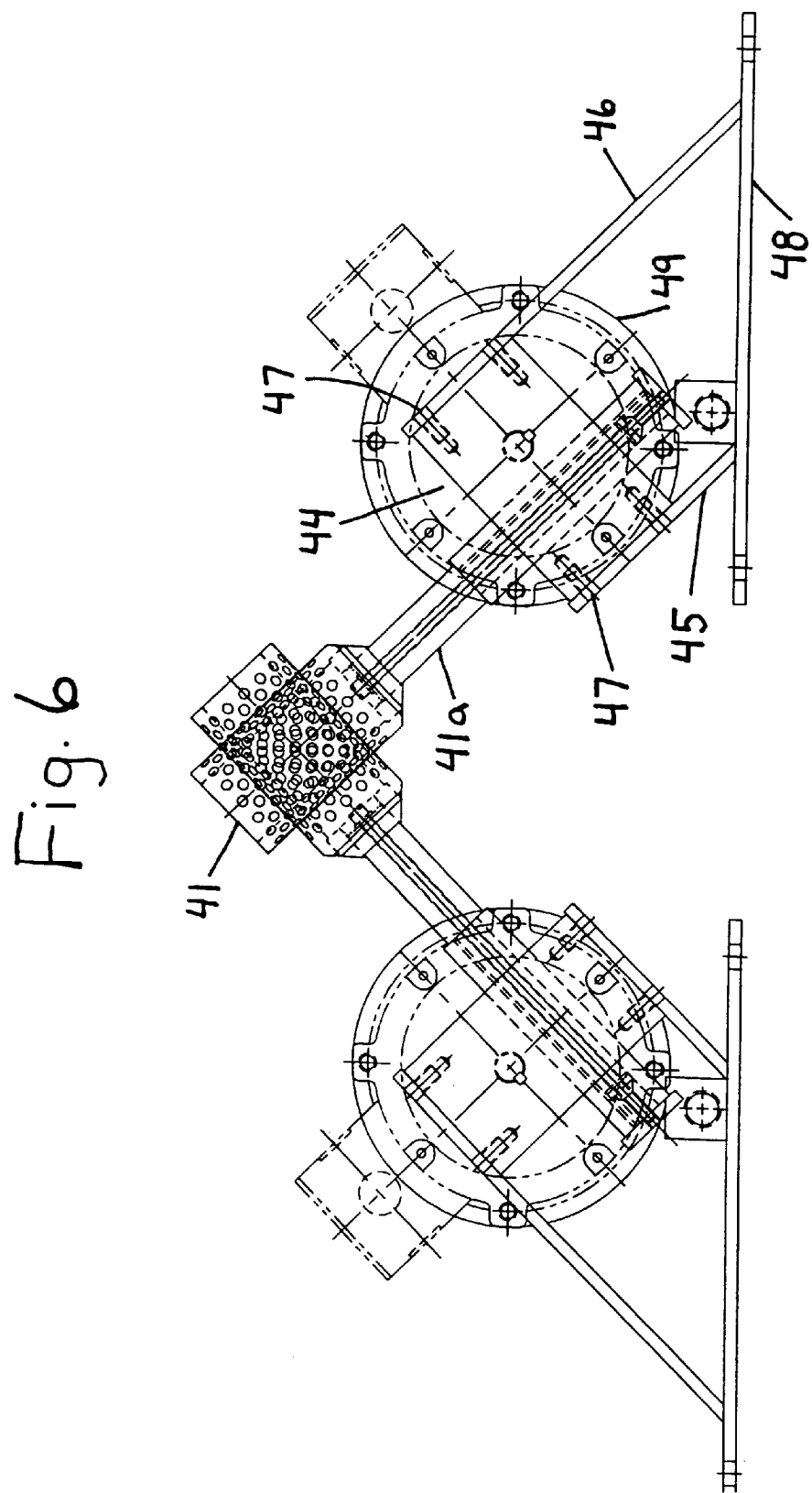
FIG. 6 is a top plan view of the input rollers shown in FIG. 1.

Referring to the drawings, wherein like numerals represent like parts throughout the several views, there is generally disclosed at 10 a sausage peeling machine. The sausage-peeling machine 10 is supported on a frame 20. The frame may be any suitable frame. As shown in FIGS. 1 and 2, the frame includes a front section having side members 21 and 22 connected to a top 23 and a bottom 24. A similar (mirror image) construction is found on the left side of the machine 10. A tabletop 25 is secured across the top 23 on the right side and the equivalent on the left side. Cross members 26 through 29 connect the two side frames to form a cube frame. Although the members are suitably connected by means such as welding, other suitable methods may be used.

The frame also includes a rear section which includes a lower member 30 and a mid-member 31 welded to an upright member 32. A similar (mirror image) frame is found on the left side of the machine 10. The two frames are connected by cross members 33 and 34. The lower member 30 and mid-member 31 are also connected to the side member 22. Again, suitable means for connecting these members are utilized, such as welding. An end plate 35, which extends across the width of the machine 10, is secured to the side member 22 by suitable means such as bolts 37. The bottom of the end plate 35 rests on the mid-member 31. A second end plate 36 is secured to the upright member 32 by suitable means such as bolts 37. Similarly, the end plate 36 extends across the width of the machine 10 and rests its bottom on the mid-member 31. Two central support members 38 and 39 extend the length between the end plates 35 and are suitably connected to the end plates 35 and 36 by means such as welding.

The apparatus 10 also includes an input conveyor, generally designated at 50. The input conveyor is shown in FIGS. 3 through 5. Preferably, the input conveyor 50 is utilized to more easily feed the sausage 11. The input conveyor 50 is secured to the tabletop 25 by two clamps 51. The clamps 51 are similar and only one will be discussed in detail. The clamps have a generally triangular shape for rigidity and include an upright member 51a, a bottom member 51b and an angled member 51c. The members are suitably connected by means such as welding. The bottom member 51b has two holes through which bolts are inserted. A nut 53 is positioned underneath the tabletop 25 and secured to the bolt 52, thereby securing the clamps 51 to the tabletop 25. Secured to the upright member 51a is a top extension 51d and a bottom extension 51e. An aperture is formed in the top 51d and a threaded rod 54 having a knob 54a attached thereto is positioned in the aperture. The bottom of the threaded rod 54 rests on the bottom extension 51e. A connecting rod 55 has at one end a threaded collar 55a secured thereto and at its other end it is secured to a back plate 56. The connecting rod 55 may be secured to the back plate by suitable means such as welding or by use of nuts and lock washers. Other suitable methods may be used to secure the rod 55 to the back plate 56, which are well known in the art.

As will be described more fully hereafter, the back plate 56 carries the rotating portion of the conveyor 50. The back plate 56 has two extensions (only one of which is shown) 56a to which sprockets 57 are suitably attached. The other back plate being hidden from view in FIG. 3 by the motor and gear. The sprockets 57 have a suitable gear 190 driven by a motor 191 to drive the conveyor at a desired speed. Either sprocket 57 may be driven, although it has been found easier to drive the sprocket which is over the table 25 such that the drive motor may rest on the tabletop 25. A drive belt 58 is in the form of an endless belt and is positioned around the two sprockets 57. Suitable openings are formed in the drive belt 58 for engagement by the teeth 57a of the sprocket 57, whereby rotation of the sprocket 57 causes rotation of the teeth 57a which engage the drive belt 58 and rotate the drive belt around the sprockets 57. A pusher member 59 is connected to the drive belt 58. The pusher member 59 has an engaging surface 59a which contacts that sausage 11 at its trailing end. The tuft 11a is formed at both the trailing and forward end of the sausage 11. The pushing member 59 provides the contact with the sausage 11 to move it into the sausage-peeling machine. A hold-down member 60 is secured to the drive belt 58 proximate the pusher member 59. The function of the hold-down member 60 is to hold the sausage 11 against the bed 61 on which the sausages are held. As the sausage 11 is fed into the sausage peeling machine 10, the trailing end of the sausage will tend to move around both horizontally and vertically. The hold-down member 60 prevents this movement of the sausage 11 being fed into the machine so that there are no jams with a sausage waiting to be fed and inline on the bed 61. The bed 61, as shown in FIG. 4, is angled downward to allow the sausage 11 to feed into the position beneath the drive belt 58. The bed 61 has a support post 61a having one end secured to the bed 61 and the other end secured to the table 25.

The height of the drive belt 58 above the tabletop 25 is adjusted simply by turning the knob 54a. This causes the threaded collar 55a to move either up or down, thereby moving the back plate 56 and thereby the drive belt 58 up or down. This allows for different diameter sausages to be dispensed.

An infeed mechanism (see FIGS. 1, 2 and 6) includes first and second rollers 40 and 41. An outfeed mechanism includes first and second rollers 42 and 43. The rollers 40 through 43 are similar and only one will be described in detail. The roller 41 has a shaft 41a which is operatively connected to a gearbox 44. The gearbox 44 is secured to two plates 45 and 46 by means of bolts 47. The plates 45 and 46 have one end welded to an intermediate plate 48. Positioned below the gearbox and operatively connected to the gearbox is a motor 49 for driving the gearbox and thereby the shaft 41a and roller 41. The plate 48 is adjustably mounted to the plate 35 to allow for a height adjustment when different diameter sausages are processed. A threaded collar is secured to the plate 48 and a block 35a is mounted to plate 35. A threaded rod 48b is positioned in the collar 48a. A knob 48c rotates the rod and moves the plate 48 vertically. A locking knob 35b s used to secure the plate in position. The upper roller 40 is similarly mounted. The stainless steel feed rollers 40 and 41 mechanically feed the sausage 11 along the feed path until its trailing end passes the rollers 40 and 41.

The rollers 40 and 41 have teeth to frictionally grip the sausage 11 as the rollers 40 and 41 make rotating contact. The teeth of the rollers 40 and 41 have sharp edges to better grip the casing of the sausage. The rollers 40 and 41 are also mounted in a skewed relationship to the sausage feed path. The axis of rotation of the roller 40 crosses the top of the sausage feed path at an angle 45 degrees left of perpendicular. The axis of rotation of the roller 41 crosses the bottom of the sausage feed path at an angle 45 degrees right of perpendicular. When feeding the sausage 11, the rollers 40 and 41 impart motion in a longitudinal direction along a longitudinal axis of the sausage 11. At the same time, they impart motion to rotate the sausage 11 around its axis. The result is at a reference point on any maximum diameter of the sausage 11 will move along a helical path. For this example, the sausage 11 is considered to be a cylinder, except for a rounded nose and a rounded tail at its extreme end portions. Therefore, the helical path is a cylindrical helical path. This invention is also applicable to sausage having any slight taper from one end to another, such that a reference point on a selected diameter would move along a spiral.

Similarly, the outfeed mechanism rollers 42 and 43 are oriented similarly to likewise drive the sausage 11 along the feed path and move the trailing end of the sausage out of the peeling machine 10. The use of the angled drive rollers is known in the art, such as shown in U.S. Pat. No. 4,637,095. The detailed description of the outfeed mechanism rollers 42 and 43 will not be described in more detail as they are similar to the first and second rollers 40 and 41 of the infeed mechanism. One skilled in the art can readily understand their use and function, especially in light of the teachings described in U.S. Pat. No. 4,637,095.

Figure 7:
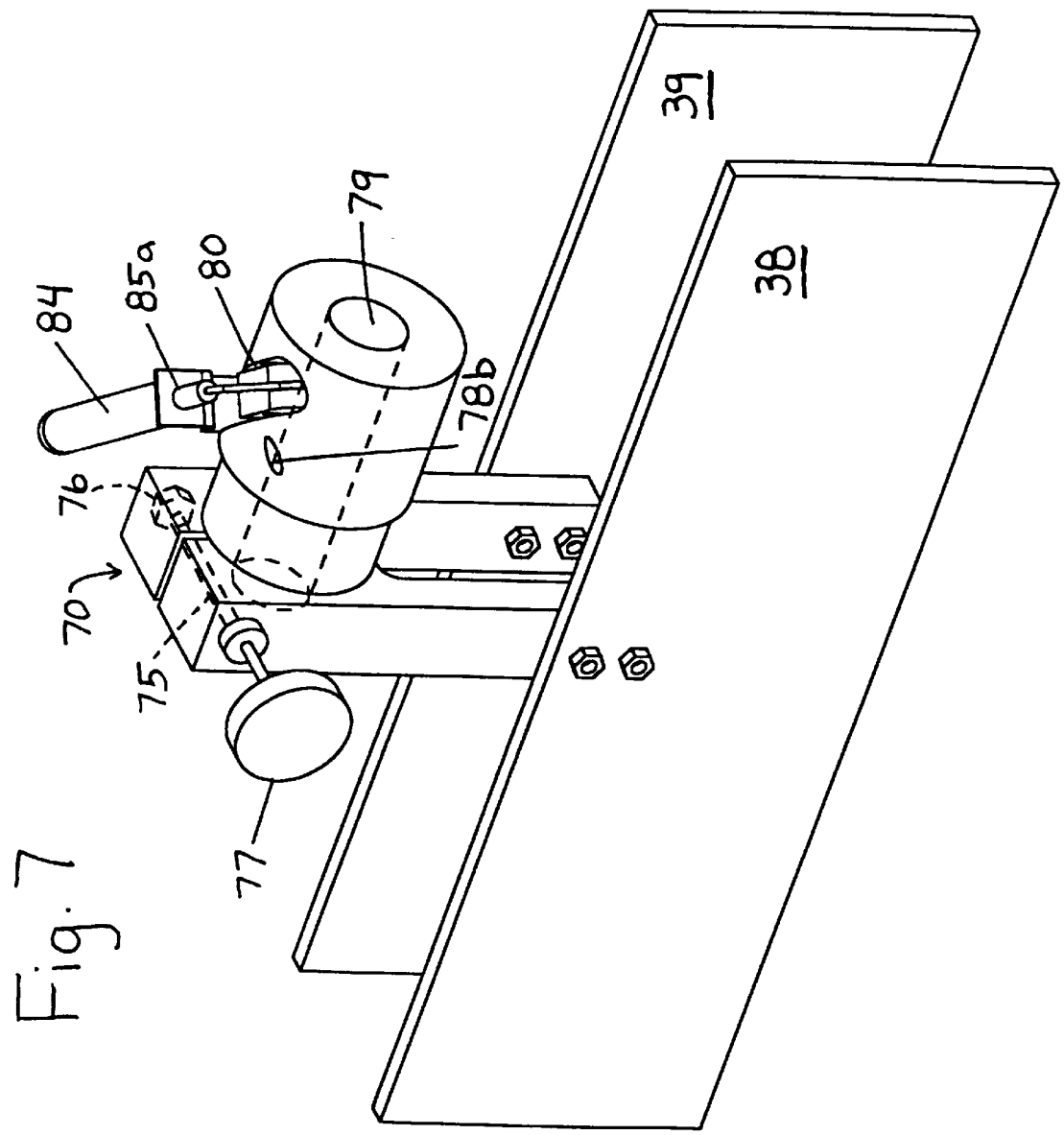
FIG. 7 is a perspective view of the knife blade assembly shown in FIG. 1.

A knife blade assembly 70, as best shown in FIGS. 7 and 8, is mounted downstream of the rollers 40 and 41 along the feed path of the sausage 11. The knife blade assembly 70 includes a split yoke 71. The yoke 71 has a first leg 72 secured to the central support member 38 and a second leg 73 secured to the central support member 39. The legs 72 and 73 are secured by suitable means such as nuts and bolts. The top portion of the legs 71 and 72 have an inner surface which defines a generally cylindrical opening 74. Formed in the top section of the legs 72 and 73 is a bore through which a threaded shaft 75 is inserted. One end of the threaded shaft is secured to a bolt 76 which is in turn secured to the outside of the second leg 73. At the other end of the shaft 75 is a knob 77 used to rotate the shaft 75. The knife blade assembly also includes a cylindrical member 78 which is sized and configured to fit inside of the cylindrical opening 74. Rotation of the knob 77 will either bring the legs 72 and 73 closer together or farther apart. If loosened, the cylindrical members 78 may be rotated within the cylindrical opening 74. Then, when the cylindrical member 78 is in the correct location, the knob 77 is turned to bring together the two legs 72 and 73 thereby securing the cylindrical member 78 in a fixed position.

The cylindrical member 78 has a bore 79 formed therein. The bore 79 is along the feed path of the sausage 11 and the sausage 11 travels through the bore 79. The cylindrical member 78 has a slightly larger end section 78a in which a slot 80 is formed. The slot 80 provides access for a cutting edge of a knife. The slot 80 extends into the bore 79. A knife blade holder 81 is pivotally mounted within the slot 80 by means of a shaft 81a that extends through the width of the knife blade holder 81 and is supported at each end by the cylindrical member 78a. Access to the shaft 81a is provided through opening 78b. A knife blade 82 having a cutting surface 82a is secured in the knife blade holder by means of nuts and bolts 83, or other suitable means. By being releasably secured in the knife blade holder 81, the knife blade 82 may be easily removed when the cutting surface 82a becomes dull. An air cylinder 84 provides a biasing force to force the cutting surface 82a against a sausage 11. The air cylinder is mounted in a support member 85 which has an aperture 85a through which the air cylinder 84 is secured. The other end of the support member 85 is secured to the cylindrical member 78 and section 78a by suitable means such as screws. The air cylinder 84 has a retractable end 84a to which a cord 86 is secured. The other end of the cord 86 is secured to a shaft 81b which extends through the knife blade holder 81. By securing the far end of the cord 86 to the shaft 81b, a pivoting and biasing force may be provided in a downward direction, as viewed in FIG. 8. The biasing force is only provided in one direction and the amount of force may be adjusted by the amount that the end 84a is retracted into the cylinder 84. While the cylinder 84 is an air cylinder, other cylinders such as hydraulic cylinders or suitable means of providing a biasing and pivoting force for the knife blade holder 81 may be utilized. As previously mentioned, it is important that the leading end of the sausage 11 be slit at a particular location. It is preferable that the slit starts just adjacent to the tuft 11a at a position about ten o'clock when viewed from the left in FIG. 7. Depending upon the feed rate and amount of rotation imparted on the sausage 11 by the rollers 40 and 41, the location of the start of the cut may be adjusted by rotating the cylindrical member 78. It is important that the sausage be delivered to the tucker plate assembly so that the slit is at the ten o'clock position as the tuft 11a encounters the grasping members of the tucker plate, as will be described more fully hereafter.

Downstream from the knife blade assembly is positioned a tucker plate assembly, generally designated as 90. The tucker plate assembly is shown in detail in FIGS. 9 and 10. The tucker plate 91 is shown in FIGS. 11 and 12. The tucker plate 91 is generally rectangular with a top extension 91a and an opening 91b formed at the bottom. Two angled sections 91c form the bottom of the opening 91b. The opening 91b is sized to allow the tuft 11a of the leading edge of the sausage 11 to protrude through the opening, but not allow the sausage itself to pass through. On the backside of the plate 11 is a generally rectangular mounting member 92 which has a bore 92a extending there through. A shaft 93 extends through the bore 92a and is used for pivotally mounting the tucker plate 91 to the frame 20. End members 94 and 95 are secured to supports 96 and 97 respectively, by suitable means such as bolts 98. The supports 96 and 97 are welded to side panels 99 and 100 respectively. The side panels 99 and 100 are secured to the central support members 38 and 39 respectively by suitable means such as bolts. The end members 94 and 95 have apertures formed therein in which bearings 101 and 102 are positioned. The shaft 93 is positioned for rotation in the bearings 101 and 102. Positioned around the shaft 92 and operatively connected thereto is a disc 103. The disc 103 has a groove in which a cord 104 is secured. The other end of the cord 104 is secured to an air cylinder 105 having a retractable end 105a. Again, the cylinder may be a hydraulic cylinder or other suitable means of providing a force on the cord 104. The air cylinder 104 is mounted to the side panel 99 by means of a side support 106.

Figure 9:
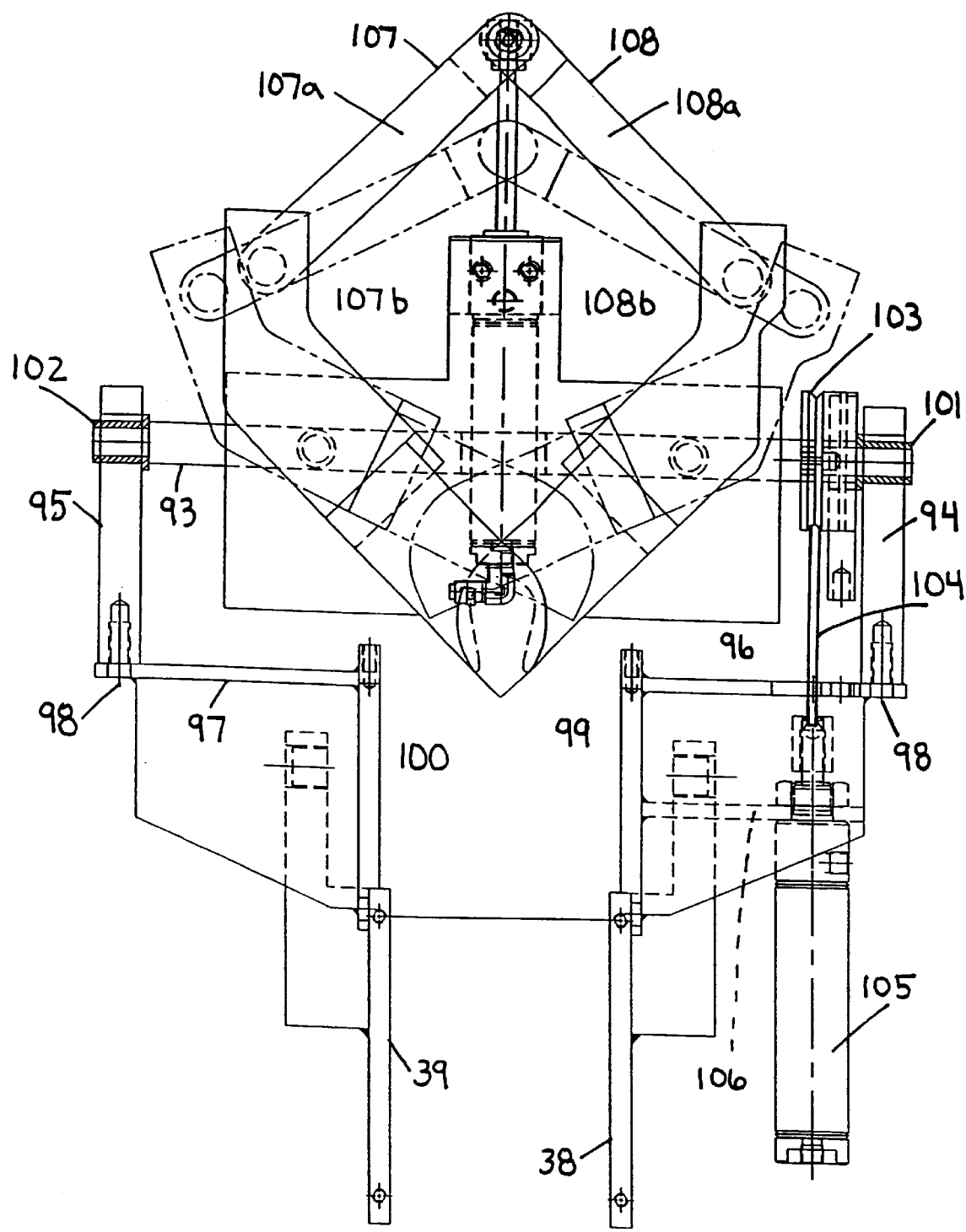
FIG. 9 is a front elevational view of the tucker plate assembly shown in FIG. 1, the tucker plate assembly being shown in two positions.
Figure 10:
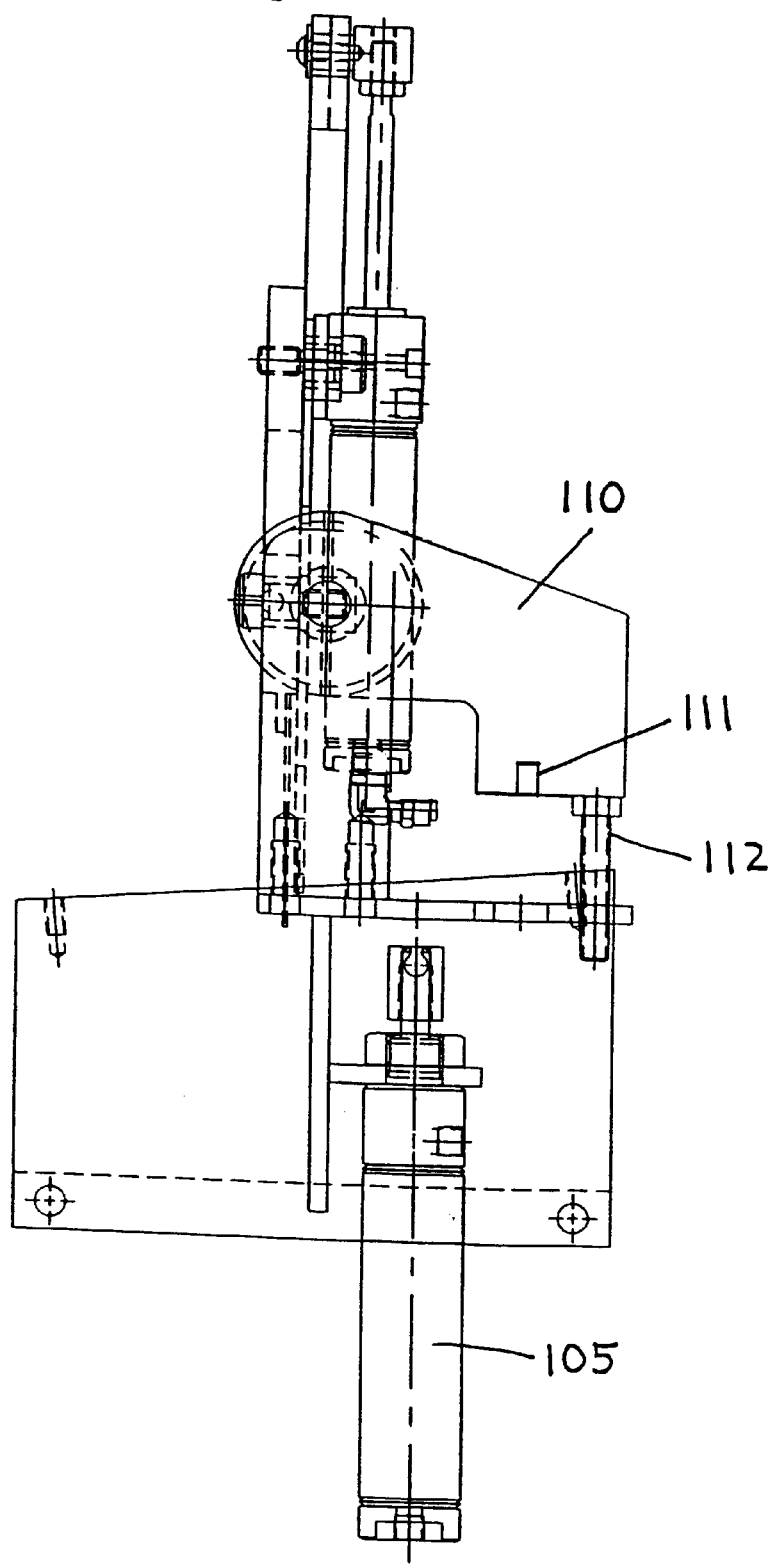
FIG. 10 is a side elevational view of the tucker plate shown in FIG. 9.

A grasping member includes a pair of scissors arms 107 and 108. Each arm has a first member 107a and 108a pivotally connected to a second member 107b and 108b. The second members 107b and 108b are rotatably mounted onto the tucker plate through the apertures 91d. An air cylinder 109 is mounted to the top section 91a through openings 91e with suitable means such as nuts and bolts. The air cylinder 109 has an extendable arm 109a. The end of the extendable arm is connected to the first components 107a and 108a. When in the retracted position, the arms are as shown in phantom in FIG. 9. When extended to a grasping position, the arms are as shown in solid lines in FIG. 9. When in the retracted position, the end of the second components 107b and 108b do not block the opening 91b. However, when in the engaged position, the members 107b and 108b close on the opening 91 and grasp the tuft 11a which is extending through the opening 91b. Further, as can be seen in FIG. 9, the arms have a downward motion and thereby tuck the tuft 11a downward into stripping rollers, as will be described more fully hereinafter.

An extension arm 110 is secured to the disc 103 so that rotation of the disc 103 causes rotation of the arm 110. A proximity switch 111 is positioned in the arm 110. A bolt 112 having a metal head is positioned on the support 96 to be under the proximity switch 111. When in the position shown in FIG. 10, the proximity switch 111 and bolt 112 cooperate to indicate that the tucker plate is in a vertical position. When moved to the position shown in FIG. 2, by movement of the air cylinder 105, the proximity switch is further away from the bolt 112 and provides input for actuation of the scissors arms 107 and 108 as will be described more fully hereinafter. The switch and bolt are calibrated, so that a very small movement is sufficient for the switch to sense the movement.

Figure 13:
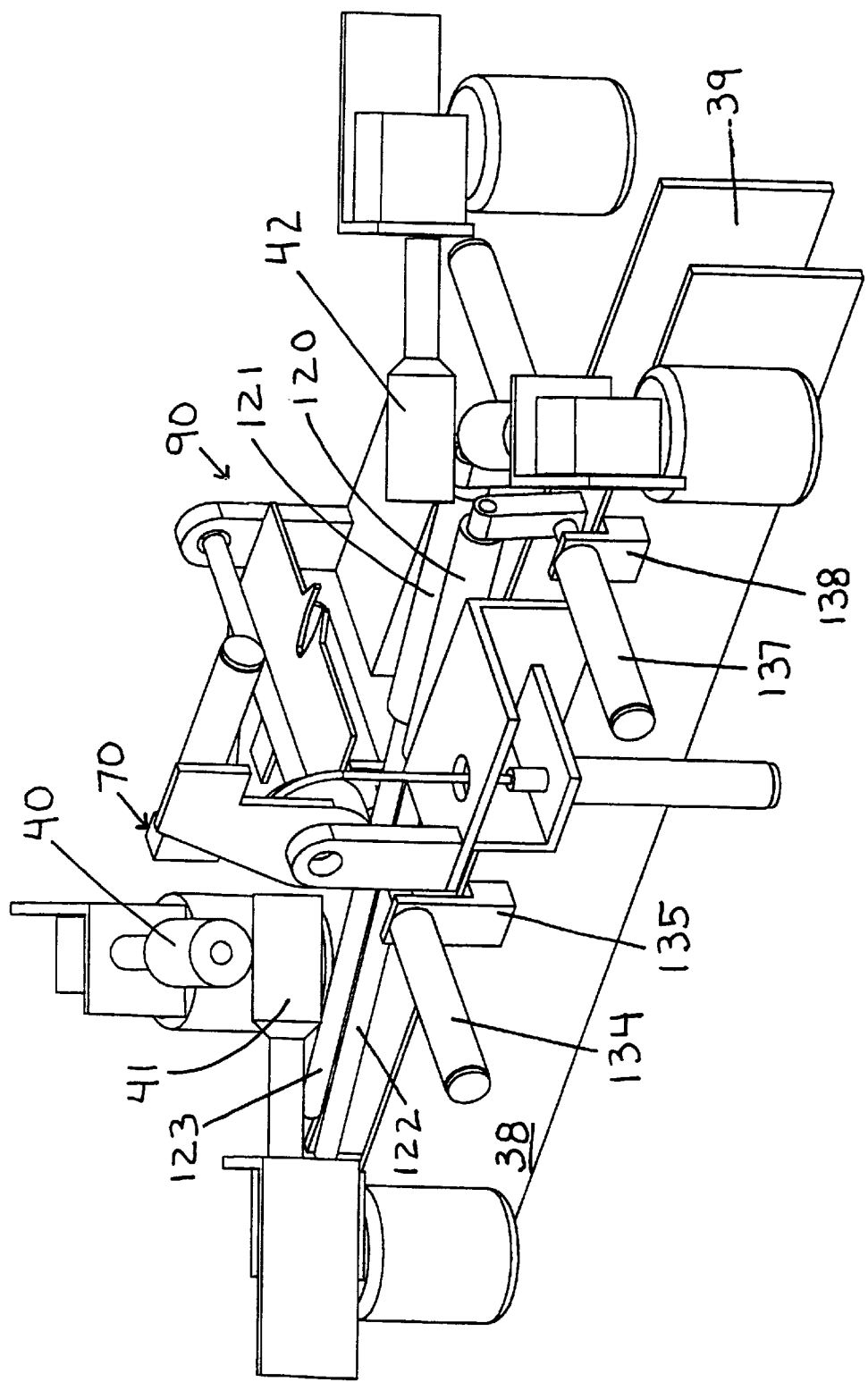
FIG. 13 is a perspective view of a portion of the apparatus shown in FIG. 1 to show the orientation of the various components, but lacking specific detail which is shown in the other views.

Referring especially to FIGS. 2, 13 and 14, there is shown a pair of stripper rollers 120 and 121. The stripper rollers are located downstream from the knife blade assembly 70 and are positioned at a slight upward incline with respect to the horizontal as you go downstream on the feed path. The stripper rollers 120 and 121 are mounted on two shafts 122 and 123 respectively. At one end, the shaft is supported by and operatively connected to a motor 124. At the other end, the shafts 122 and 123 are supported in two bearing blocks 125 and 126. FIG. 15 shows a plate 170 secured between members 38 and 39 by suitable means such as bolts. At their bottom ends, the blocks 125 and 126 are pivotally secured to the plate 170 by suitable means such as a shoulder bolt 171. At the top of block 125 is an opening in which the shaft 120 rotates and is supported. At the top of block 126 is an opening in which the shaft 121 rotates and is supported. A screw may be inserted in threaded hole 125a. The head of the screw 125a will extend toward member 38. The amount of extension will limit the rotation of block 125. The motor 124 is suitably mounted under the tabletop 25 by means of bolts 127 and mounting plates 128 and 129. It is understood that any suitable means of mounting the motor 124 may be utilized. The output of the motor 124 is connected to a coupling 130. The coupling provides rotational movement to both of the shafts 122 and 123. Extending from the coupling 130 to a gearbox 131 are two shafts. The gearbox 131 causes the shafts to rotate in opposite directions so that the shaft associated with shaft 122 rotates counterclockwise and the shaft is associated with shaft 123 rotates clockwise. The shafts are then connected to a U-joint 132. Operatively connected in the U-joint 132 are the shafts 122 and 123. The shafts 122 and 123 are elongate and are at a spaced apart distance when the sausage 11 enters the knife blade assembly.

The stripper rollers 120 and 121 have a plurality of gripping teeth 133 around a plurality of holes. It is understood that any suitable gripping mechanisms may be used such as grooves, etc. An air cylinder 134 is mounted on a block 135 which is in turn secured to the central support member 38. The cylinder 134 has an extendable arm 134a which contacts and moves the shaft 122 when extended. When extended, the end 134a moves the shaft 122 inward, thereby moving the roller 120 closer to roller 121. A similar cylinder 136 having an extendable arm 136a is mounted to the central support member 39 to move the shaft 123 inward, as will be described more fully hereafter. Another air cylinder 137 has an extendable arm 137a and the cylinder is mounted to the support member 38 by means of a block 138. The extendable arm 138a contacts the bearing block 125 and, similar to cylinder 134, will move the shaft 122, and thereby the roller 120, closer to the other roller 121. Another air cylinder 139 having an extendable arm 139a is mounted to the central support member 139 to similarly move the shaft 123, and thereby the stripper roller 121 closer to the stripper roller 120. The air cylinders 134, 136, 137 and 139 may also be hydraulic cylinders or other suitable means to provide a motive force to the shafts 122 and 123.

While not seen in other views, a vacuum block 175 is shown in FIGS. 16 and 17. The vacuum block 175 is positioned immediately below the stripper rollers 120 and 121. The block 175 is secured to member 38 through bolts in holes 175*a*. The other side of the block is similarly secured to member 39. As shown in FIG. 16, the block 175 is inclined upward to match the incline of the shafts 122 and 123. There is a rectangular opening at the top surface of the block 175. The opening is positioned below the rollers 120 and 121 and is centered along the meeting surfaces of the rollers. The rectangular opening 176 is transformed to a circular opening 178 at the bottom of the block 175. A vacuum hose 177 is attached to the circular opening 178 and a vacuum is applied by a vacuum source 179. Any other suitable configuration may be utilized to provide a vacuum underneath the stripper rollers 120 and 121.

Guide tubes (not shown) may be used at the input end and discharge end. At the input end the tube would be before the rollers 40 and 41. The tube would be an elongate cylinder with a slot extending along the top. At the discharge end, the tube would start before the rollers 42 and 43 and continue past the rollers 42 and 43. The tube would again be an elongate cylinder with a slot on the top but would also be notched out to allow for the rollers 42 and 43. The purpose of both guide tubes would be to keep the sausages from bending. This is especially important for soft sausages.

In operation, as shown in FIG. 4, four sausages 11 are placed on the incline bed 61. The operator then hits a start button (not shown) to actuate the input conveyor 50. As the conveyor 50 rotates, the pusher member 59 will come around from the top of the drive belt 58 and come behind the sausage 11 and begin pushing it along its feed path into the first and second rollers 40 and 41. As the trailing end of the sausage 11 begins to exit the input conveyor, there is a tendency for the sausage to move both vertically and horizontally. However, the hold-down member 60 causes the sausage 11 to stay flat against the bed 61 and not allow for movement of the trailing end of the sausage. If the trailing end of the sausage were to move, the sausages which were stacked up on the bed 61 to be fed next would have a tendency to become jammed with the sausage being fed.

The feed path of the sausage 11 from the input conveyor 50 is between the rollers 40 and 41. The stainless steel feed rollers 40 and 41 mechanically feed the sausage 11 along the feed path until its trailing end has passed the feed rollers 40 and 41.

The feed rollers 40 and 41 have teeth running generally parallel to their axes of rotation to frictionally grip the sausage 11. The skewed mounting of the rollers cause the sausage 11 to be both fed longitudinally as well as rotating it. The feed path of the sausage from the input rollers 40 and 41 is to the knife blade assembly 70. The firmness of the sausage and other characteristics may effect the speed at which the feed rollers 40 and 41 feed the sausage. Since it is important that the sausage be maintained at a set speed, the input conveyor provides for a constant speed delivery of the sausage 11. The input conveyor 50 and the drive rollers 40 and 41 are set at the same speed. If there is slippage with the drive rollers 40 and 41, the input conveyor will be utilized to maintain the desired speed. The feed path of the sausage 11 takes the leading end of the sausage into the bore 79 of the knife blade assembly 70. There, the cutting surface 82*a* contacts the sausage 11 and begins slicing the sausage proximate the tuft 11*a*. The knife blade 82 is biased toward the center of the bore 79. Therefore as the sausage 11 is fed through the bore 79, the knife blade 82 will rise as more pressure is placed on the cutting surface 82*a* by the increased diameter of the sausage. This will cause the knife blade 82 to move away from the center. The amount or depth of the cut will be determined by the biasing force applied by the cylinder 84. The amount of retraction of the end 84*a* is set, dependent upon the density of the sausage and other considerations such as how frozen or cold the sausage is. As the sausage 11 proceeds through the bore 79, it continues along the feed path and also being rotated by the rollers 40 and 41 causing a helical path to be cut by the knife blade 82.

Then, the forward end of the sausage 11 contacts the tucker plate assembly 90. At this point, it is important that the orientation of the cut be such that the slice begins at approximately ten o'clock, when viewed from the left in FIG. 7. The input conveyor and the rollers 40 and 41 are providing for the constant speed of the delivery of the sausage 11 to the tucker plate assembly 91. The location of the cut at the leading edge of the sausage 11 proximate the tuft 11*a* may be adjusted by rotating the cylindrical member 78 in the yoke 72, as previously explained. This calibration is made and then typically is not adjusted until there is a varying condition in the sausage being slit.

Once the leading edge of the sausage 11 contacts the tucker plate assembly 90, the tuft 11*a* is protruding through the opening 91*b*. Then, as the sausage proceeds further along the feed path, the tucker plate is rotated from the horizontal position to the position shown in FIG. 1. Upon initial rotation, the proximity switch is activated by moving away from the bolt 112. This causes the end 105*a* of air cylinder 105 to extend away from the opening 91*b*. This causes the scissors arms 107 and 108 to move from their open position to a closed position. When the scissors arms close, they grasp the tuft 11*a* and push it downward in-between the stripper rollers 120 and 121.

Figure 14A:
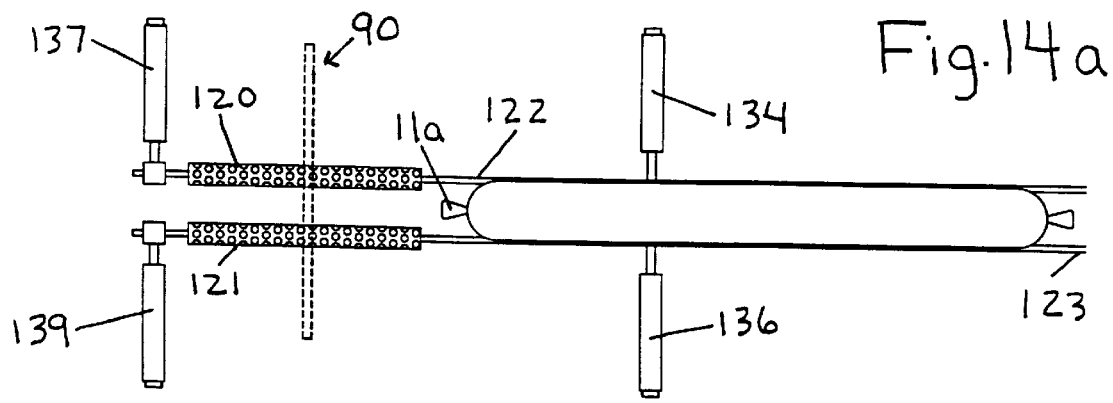
FIG. 14a is a schematic representation of a sausage prior to being peeled.
Figure 14B:
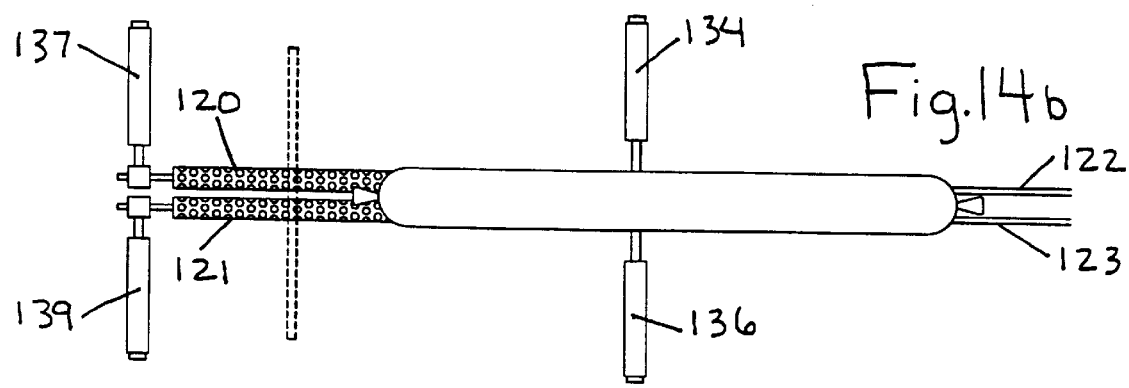
FIG. 14b is a schematic representation of the sausage as it approaches the tucker plate.
Figure 14C:
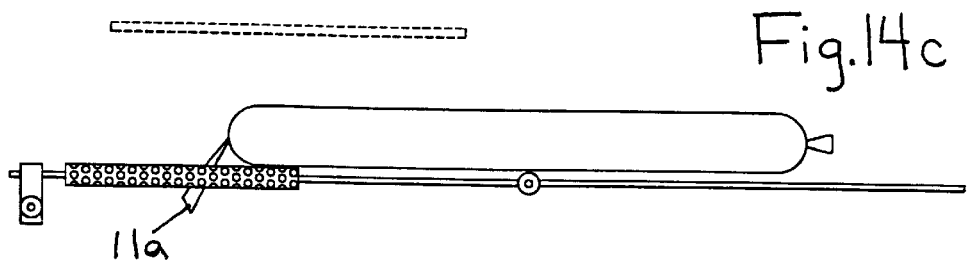
FIG. 14c is a schematic representation showing the tuft of sausage being tucked below the stripper rollers.
Figure 14D:
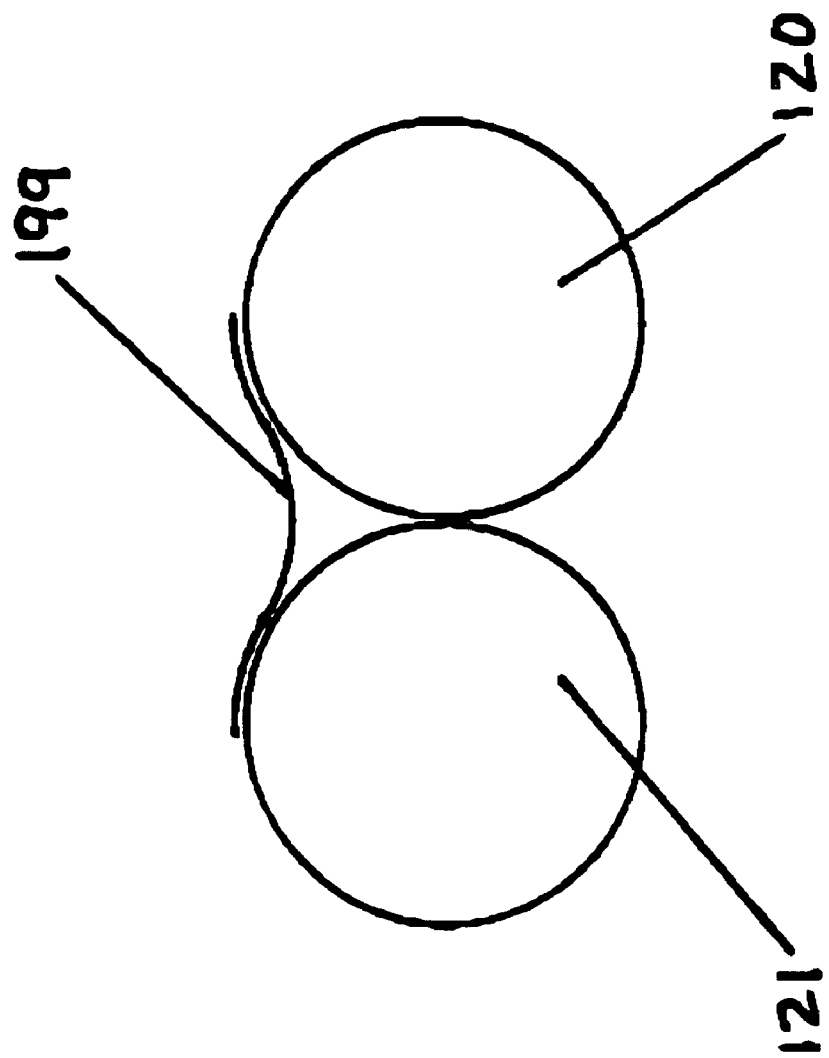
FIG. 14d is a schematic representation of an end view showing the stripper rollers in a stripping position.

Just after exiting the knife blade assembly, there is a sensor positioned which senses the sausage 11 exiting the knife blade. This sensor then activates the four cylinders 134, 136, 137 and 139 and causes them to contact the shafts 122 and 123 and slide the shafts closer together. This causes the stripper rollers to move from their spaced apart position as shown in FIG. 14*a* to their stripping or engaging position as shown in FIG. 14*b*. FIG. 14*c* shows the tuft 11*a* being tucked down between the stripper rollers 121 and 120. For illustration purposes in FIG. 14*b*, the rollers are shown to be still spaced apart. When the rollers are next to each other, they are approximately ¹/₆₄ inches apart, or nearly touching with just enough of a spacing to allow the tuft 11*a* and the subsequently removed casings to pass therebetween. The diameter of the stripper rollers are 1¼–1½ inches. This creates a generally V-shaped surface on which the sausage rests as it is being stripped. FIG. 14*d* is a schematic representation to show the V-shaped surface 199. The surface 199 actually comprises the surfaces of the rollers 120 and 121, but is shown only to indicate that area of the rollers being referred to. The trailing end of the sausage may often have an encapsulated meat area which gets stripped with the sausage casing. Therefore, as the trailing end passes over the stripper rollers 120 and 121, the four cylinders 134, 136, 137 and 139 are retracted allowing the rollers to spread apart and allowing the encapsulated meat end and any metal clip to pass through the rollers.

It should be noted that the movement of the scissors arms from the unengaged to the engaging position is extremely fast and the tucker plate is still substantially vertical while this occurs. Then, as the tuft 11*a* is being grasped by the stripper rollers and the casing is pulled downward and the casing is stripped from the sausage, the sausage continues to go forward and pushes the tucker plate to the horizontal position as shown in FIG. 1. The casing is continually stripped as the sausage continues down its feed path.

The removal of the casing is effected by the counter-rotational movement of the stripper rollers 120 and 121. A vacuum is also used to assist in the removal. The vacuum assists in drawing the casing between the stripper rollers 120 and 121 and is also then used to eject the stripped casing from below.

The forward end of the sausage 11 then contacts the outfeed rollers 42 and 43 and the sausage is ejected from the sausage peeling machine 10 along its feed path while the casing is removed from below.

The tucker plate is then rotated down to its vertical position for receiving the next sausage.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for removing a casing from a body of a sausage, wherein the casing is formed with a tuft at one end of the body, the apparatus comprising:
   (a) a frame;
   (b) an infeed mechanism operatively connected to the frame, the infeed mechanism providing forward movement of the body of the sausage along a feed path with the tuft leading the body of the sausage;
   (c) a cutting device operatively connected to the frame, for cutting the casing, the cutting device downstream from the infeed mechanism;
   (d) a tucker plate assembly operatively connected to the frame, the tucker plate assembly having a grasping member moveable from an unengaged position to an engaged position;
   (e) first and second stripper rollers positioned below the tucker plate assembly having a longitudinal axis, the rollers revolving around their longitudinal axis, the stripper rollers being substantially parallel and generally forming a V-shape surface on which the body of the sausage is position, the rollers revolving in opposite directions;
   (f) an outfeed mechanism operatively connected to the frame, the outfeed mechanism for providing forward movement of the body of the sausage after the body passes the tucker plate assembly, the outfeed mechanism located down stream from the stripper rollers; and
   (g) wherein when the body of the sausage contact the tucker plate, the grasping member moves from the unengaged position to the engaged position, forcing the tuft down between the stripper rollers, and the casing is removed.

2. The apparatus of claim 1, wherein the infeed mechanism comprises a pair of gripping feed rollers, the rollers operatively connected to the frame in a skewed relationship to the feed path to both feed the sausage along the feed path and to rotate the sausage as it is being fed.

3. The apparatus of claim 1, wherein the outfeed mechanism comprises a pair of gripping feed rollers, the rollers operatively connected to the frame in a skewed relationship to the feed path to both feed the sausage along the feed path and to rotate the sausage as it is being fed.

4. The apparatus of claim 1, wherein the cutting device comprises a knife blade mounted in a mounting block, the mounting block pivotally mounted to the cutting device, wherein the knife blade will encounter and cut the casing of a leading edge of the sausage and pivot away from the center of the sausage to cut the casing along the body of the sausage.

5. The apparatus of claim 4, wherein the cutting device further comprises:
   (a) a body having a generally circular outer region and a longitudinal bore through which the sausage moves;
   (b) the knife blade pivotally mounted to extend into the bore; and
   (c) a yoke operatively connected to the frame, the yoke having an opening in which the circular outer region is secured, wherein the circular region is rotatable in the yoke, thereby allowing positioning of the knife blade.

6. The apparatus of claim 1, wherein the tucker plate comprises:
   (a) a mounting plate having a horizontal axis, the mounting plate pivotally connected to the frame about its horizontal axis;
   (b) the mounting plate having a bottom edge and an opening formed therein, the tuft of the sausage entering the opening as it travels along the feed path; and
   (c) the grasping member positioned above the opening for forcing the tuft down between the stripper rollers.

7. The apparatus of claim 6, wherein the grasping member comprises:
   (a) a pair of scissors arms, operatively connected to the mounting plate, the arms having first and second ends;
   (b) a pneumatic cylinder operatively connected to the tucker plate, the cylinder having an extendable rod; and
   (c) the rod operatively connected to the second ends of the arms to move the second ends away from the opening, thereby bringing the first ends together and down to the opening and forcing the tuft downward.

8. The apparatus of claim 1, wherein the stripper rollers have a plurality of holes formed therein, and a vacuum is provided from below the rollers to assist in the removal of the casing.

9. The apparatus of claim 1, further comprising:
   (a) the first stripper roller mounted on a first shaft and the second stripper roller mounted on a second shaft, the shafts each having a longitudinal axis, the shafts having a first spacing when casings are not being stripped; and
   (b) a cylinder having an extendable rod, when extended the rod contacts one of the shafts and moves said one of the shafts toward the other of the shafts, wherein the stripper rollers are brought in position to strip the casing.

10. The apparatus of claim 1, further comprising an input conveyor, the conveyor comprising:
    (a) a bed on which the sausage is positioned;
    (b) a conveyor having a drive chain, the drive chain positioned above the bed; and
    (c) a motor for driving the drive chain at a speed equal to that of the infeed mechanism.

11. The apparatus of claim 10, further comprising:
    (a) a pusher member operatively connected to the drive chain for engaging and pushing the sausage; and
    (b) a hold down member positioned proximate the pusher member, the hold down member positioned to hold the sausage on the bed as it is being pushed.

12. A method for removing casings from a body of a sausage having a leading end and a trailing end, wherein the sausage is formed with a tuft on the leading end of the body, the method comprising:
- (a) feeding the body of a sausage forward along a feed path through a feeding station and rotating the sausage as it is being fed;
- (b) securing a knife blade assembly in a rotational orientation to begin slitting the casing at a selected location;
- (c) grasping the tuft of the sausage and pushing the tuft downward between two stripper rollers, wherein the casing is stripped off the sausage as it is continually fed along the feed path; and
- (d) feeding the trailing end past the stripper rollers to allow removal of the casing from the trailing end.

13. The method of claim 12, further comprising applying a vacuum to the stripper rollers from below to further assist in removing the casings.

14. The method of claim 12, further comprising moving the stripper rollers from a spaced position to an operational position as the sausage reaches the tucker plate.

15. The method of claim 12, further comprising initially feeding the sausages to the feeding station with a conveyor, the speed of the conveyor substantially equal to the speed of the feeding station.

16. The method of claim 15, further comprising holding the end of the sausage against a bed of the conveyor to prevent jams in the conveyor.

* * * * *